April 12, 1927.

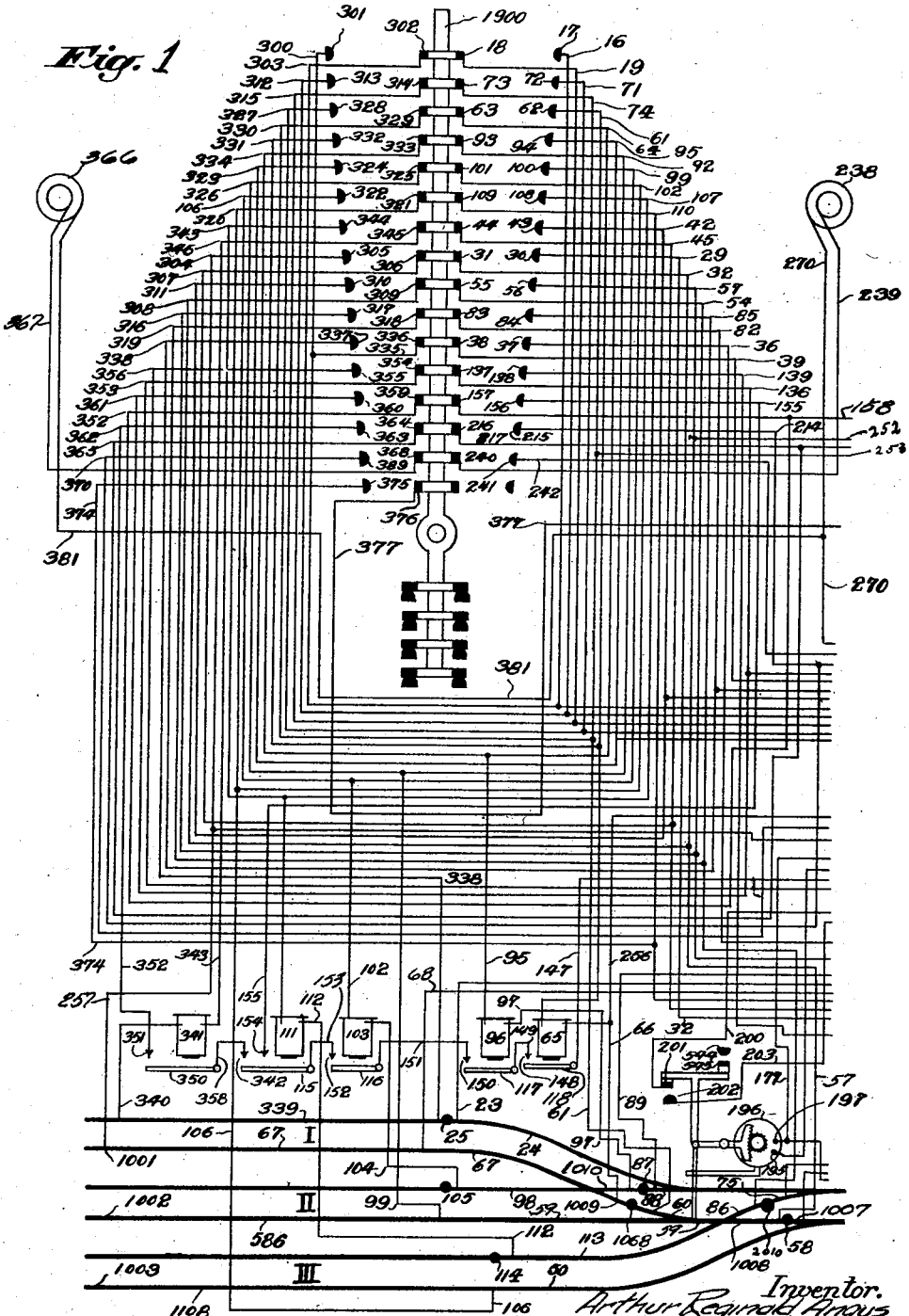

A. R. ANGUS 1,624,524

CONTROL OF TRAINS

Original Filed June 17, 1922   6 Sheets-Sheet 2

Inventor.
Arthur Reginald Angus
By
ATTORNEY

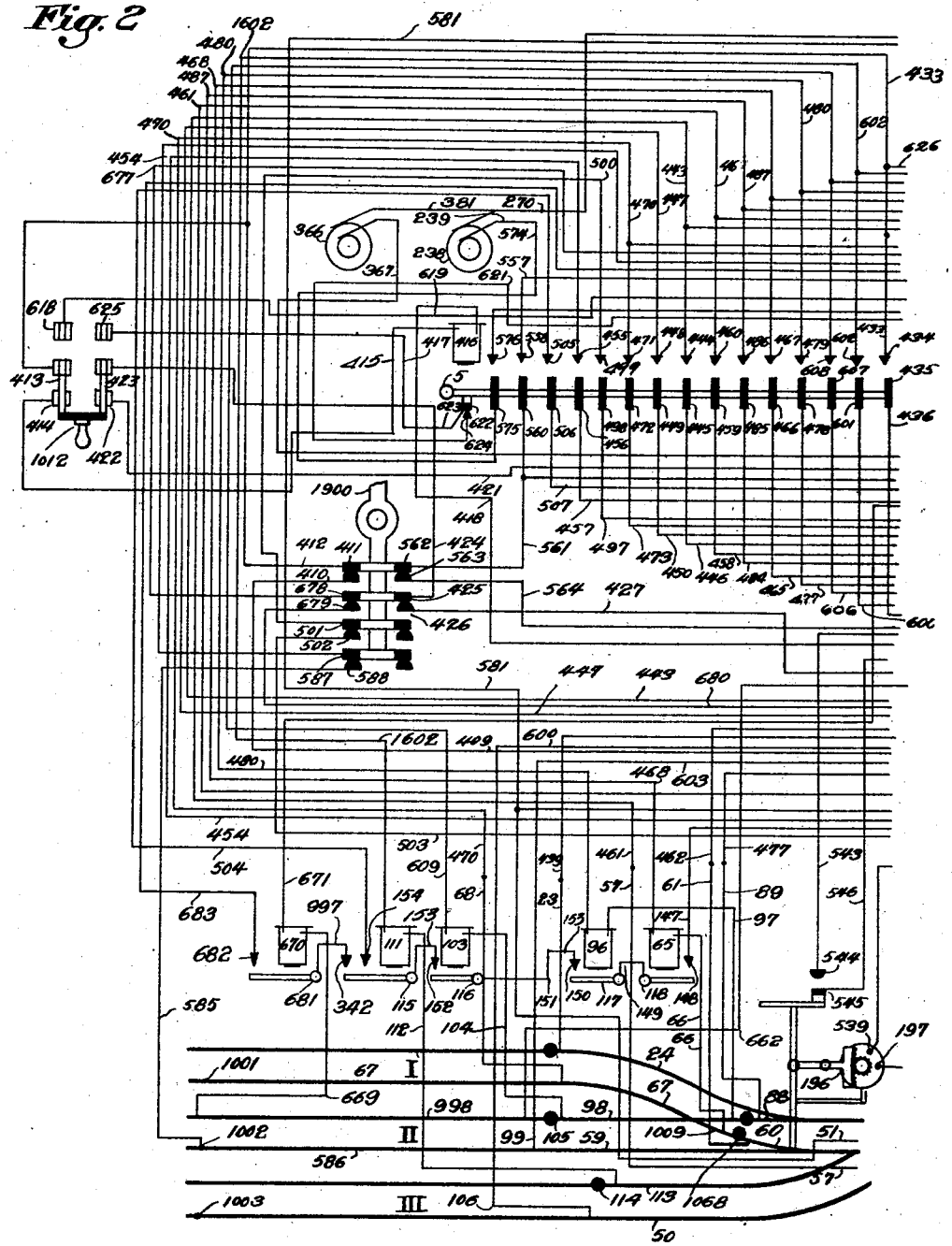

April 12, 1927. 1,624,524
A. R. ANGUS
CONTROL OF TRAINS
Original Filed June 17, 1922    6 Sheets-Sheet 4

Inventor.
Arthur Reginald Angus
By
ATTORNEY

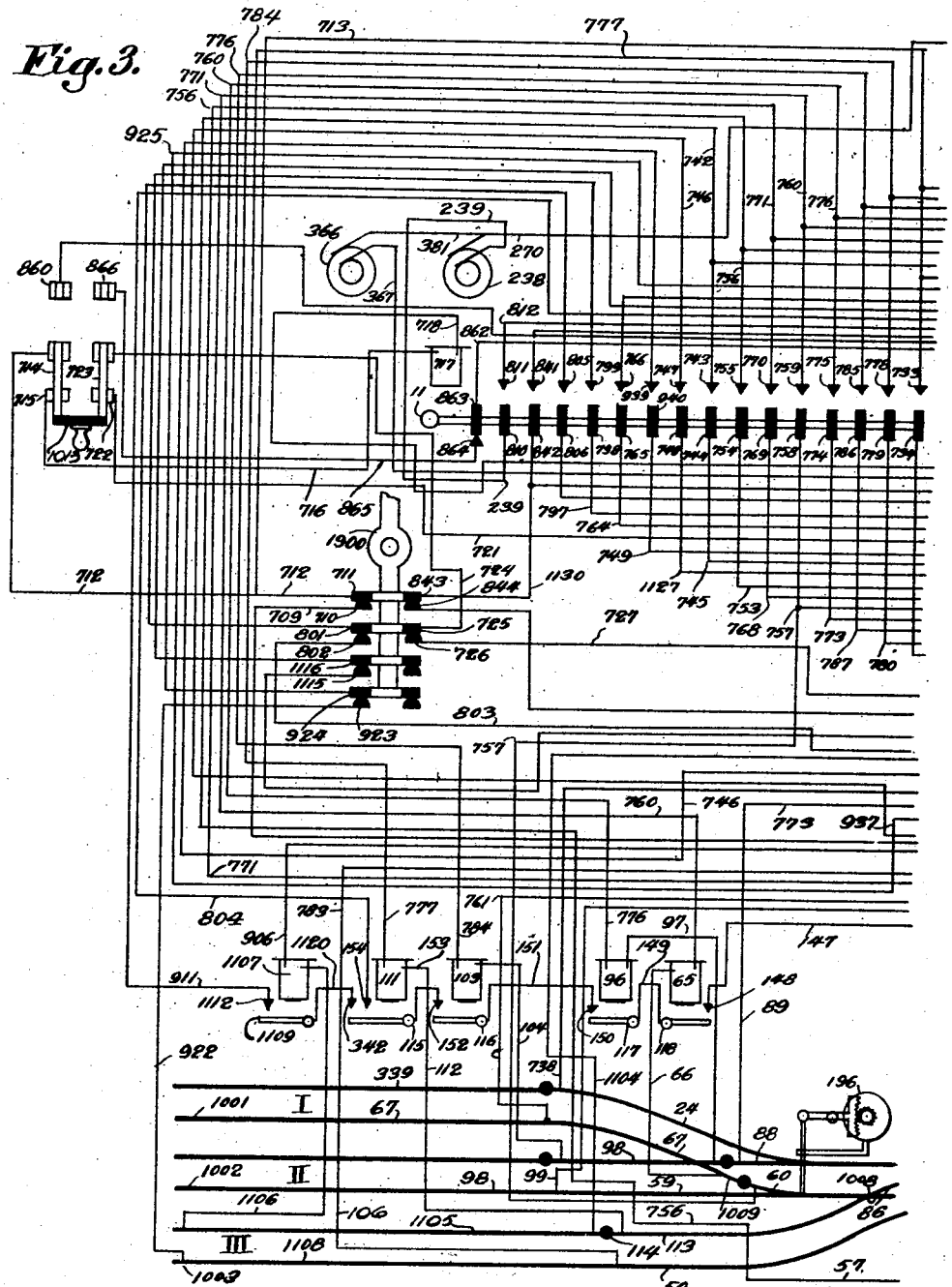

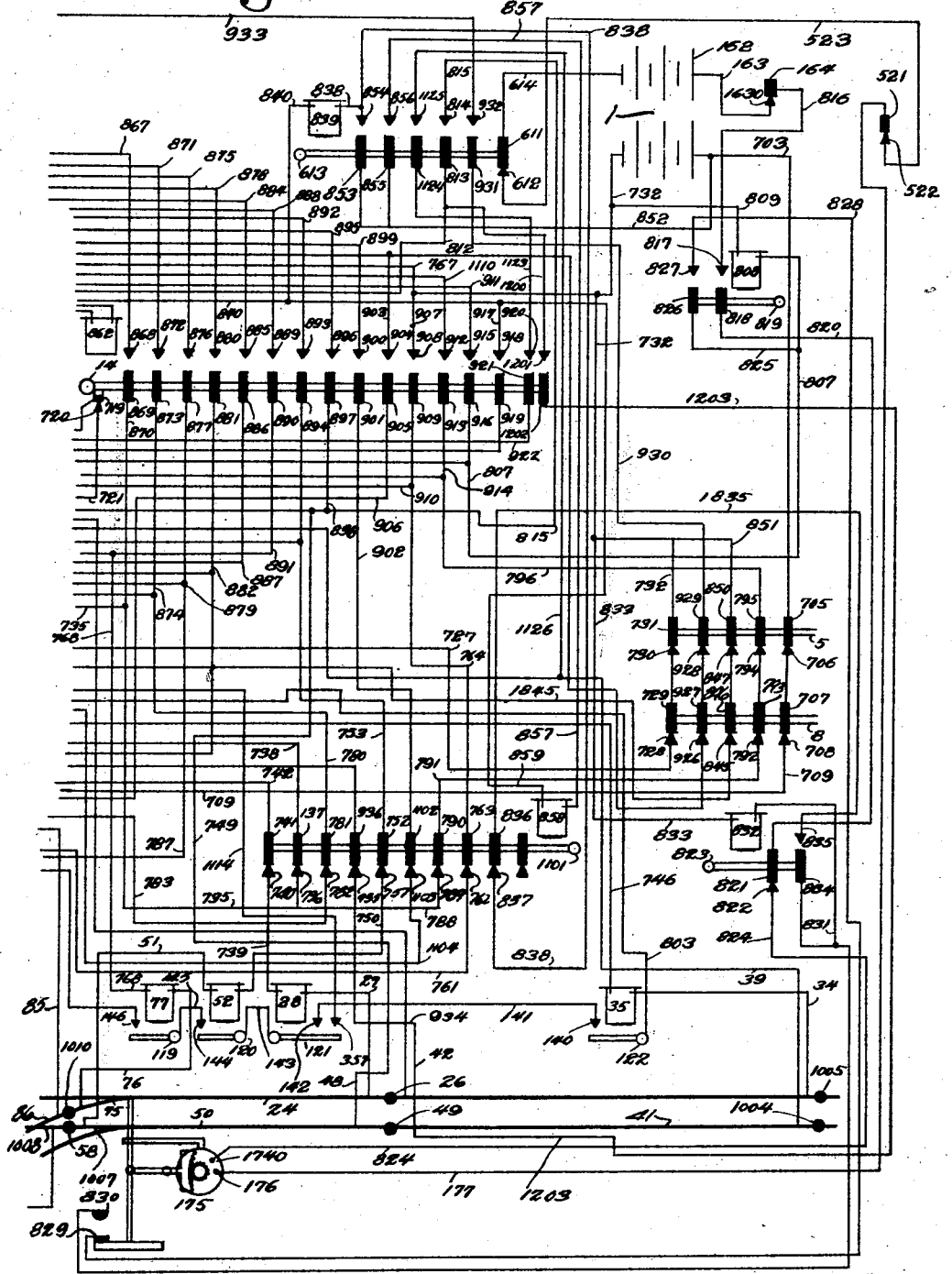

Patented Apr. 12, 1927.

1,624,524

UNITED STATES PATENT OFFICE.

ARTHUR REGINALD ANGUS, OF WESTMINSTER, LONDON, ENGLAND.

CONTROL OF TRAINS.

Original application filed June 17, 1922, Serial No. 569,125, and in Great Britain June 20, 1921. Divided and this application filed May 23, 1925. Serial No. 33,405.

The invention forming the subject-matter of the present application for Letters Patent, which is a division of my application for Letters Patent Serial No. 569,125 filed 17th June 1922, relates to track apparatus for the electrical control of trains and includes the various features set out in the claiming clauses hereof.

Figure 1A:
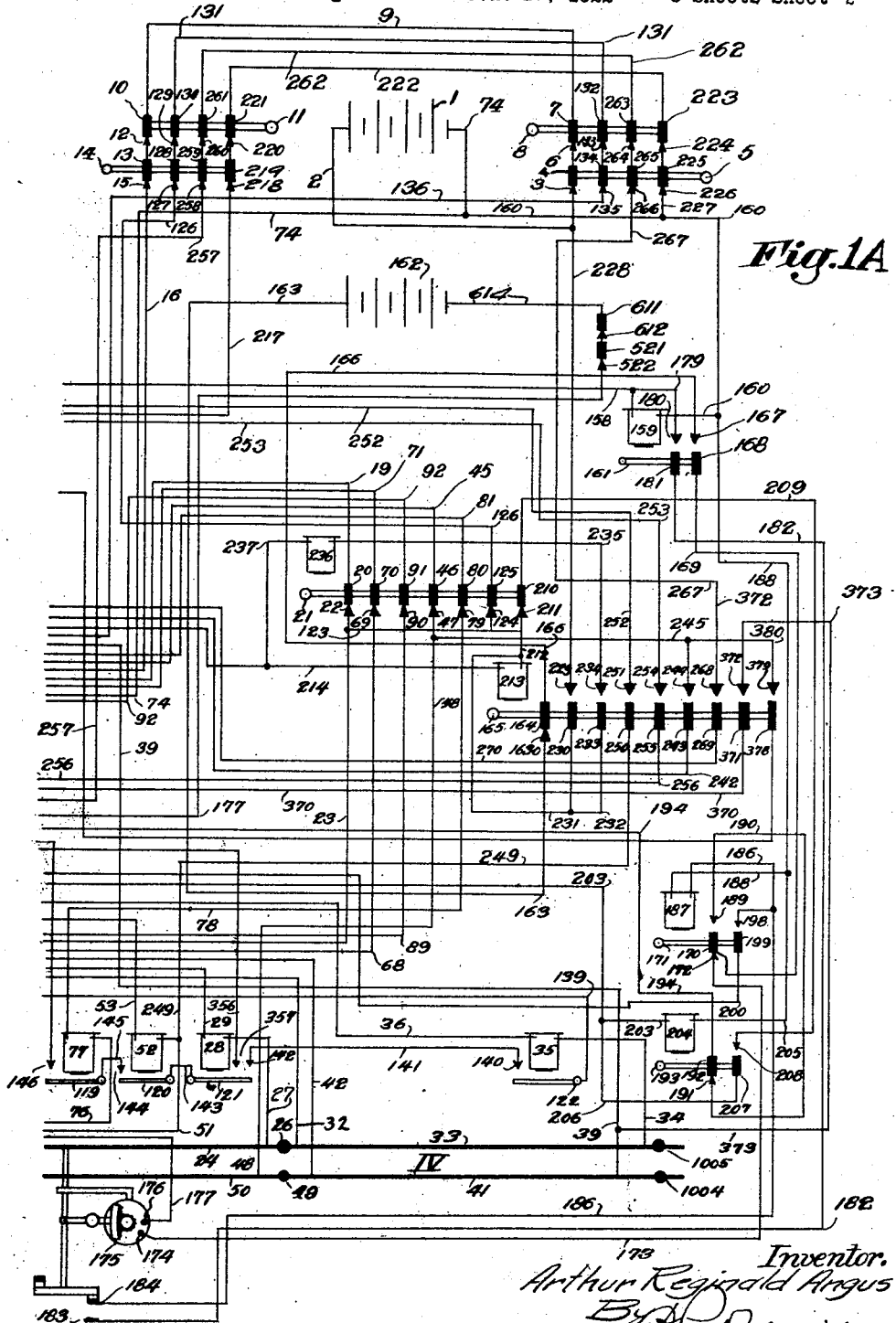

The invention is illustrated by the accompanying drawings which represent an example of a terminus comprising two sets of points for connecting as desired to a fourth portion of track any one of three portions adapted to form with the whole or part of the fourth portion three different roads in each direction of running, the three pairs of Figures 1 and 1ᴀ, 2 and 2ᴀ, and 3 and 3ᴀ showing the elements pertaining to the making of the three pairs of up and down roads respectively.

Figs. 1 and 1ᴀ together show the apparatus and connections pertaining to roads A and A', of which the road A extends from the left-hand end of the track portion I to an insulation 49 in the track portion IV and the road A' extends from the right-hand end of the track portion IV to the left-hand end of the track portion I; Figs. 2 and 2ᴀ together show the apparatus and connections pertaining to roads B and B', of which the road B extends from the left-hand end of the track portion II to the insulation 49 and the road B' extends from the right-hand end of the track portion IV to the left-hand end of the track portion II; whilst Figs. 3 and 3ᴀ together show the apparatus and connections pertaining to roads C and C', of which the road C extends from the left-hand end of the track portion III to the insulation 49 and the road C' extends from the right-hand end of the track portion IV to the left-hand end of the track portion III.

To test and make the road A, a switch arm 1900 (Fig. 1) is moved to the right into a position in which its contacts 18, 73, 63, 93, 101, 109, 44, 31, 55, 83, 38, 137, 157, 216, and 240, carried thereby but insulated therefrom, make contact with contacts 17, 72, 62, 94, 100, 108, 43, 30, 56, 84, 37, 138, 156, 215, and 241 respectively, and current then flows from a battery 1 (Fig. 1ᴀ) by way of a wire 2, a contact 3, a contact 4 on an armature 5, a contact 6, a contact 7 on an armature 8, a wire 9, a contact 10 on an armature 11, a contact 12, a contact 13 on an armature 14, a contact 15, a wire 16, the contacts 17 and 18 of the switch arm 1900 (Fig. 1), a wire 19, a contact 20 carried by but insulated from an armature 21 (Fig. 1ᴀ), a contact 22 (the contacts 20 and 22 being in contact as long as a relay 236, which controls the armature 21, is not energized) and a wire 23 to track rails 24 at a point near an insulation 25 (Fig. 1), thence along the rails 24 to a point near an insulation 26 (Fig. 1ᴀ), thence by way of a wire 27, a track relay coil 28, a wire 29, the contacts 30 and 31 of the switch arm 1900, and a wire 32 to track rails 33 (Fig. 1ᴀ) at a point near the insulation 26 but on the other side thereof, thence along the track rails 33 to a point near an insulation 1005 (at the right-hand end of the track portion IV) thence by way of a wire 34, a track relay coil 35, a wire 36, the contacts 37 and 38 on the switch arm 1900, and a wire 39, to track rails 41 (Fig. 1ᴀ) at a point near an insulation 1004 (opposite the insulation 1005), thence along the rails 41 to a point near the insulation 49, thence by way of a wire 42, the contacts 43 and 44 of the switch arm 1900, a wire 45, a contact 46 carried by but insulated from the armature 21 (Fig. 1ᴀ), a contact 47, and a wire 48 to track rails 50 at a point near the insulation 49, thence along the rails 50 and a points blade 1007 (Fig. 1) to a point near an insulation 58, thence by way of a wire 51, a track relay coil 52, a wire 53, a wire 54 (Fig. 1), the contacts 55 and 56 of the switch arm 1900, and a wire 57 to a track rail 1008 at a point near the insulation 58, thence along track rails 1008, 59 (Fig. 1), and 60 to a point near an insulation 1068, thence by way of a wire 61, the contacts 62 and 63 of the switch arm 1900, a wire 64, a track relay coil 65, and a wire 66 to a track rail 1009 at a point near the insulation 1068, thence along track rails 1009 and 67 to a point opposite the insulation 25, and thence by way of a wire 68, contact 69 (Fig. 1ᴀ), a contact 70 carried by but insulated from the armature 21 (the contacts 69 and 70 being in contact when the relay coil 236 is not energized), a wire 71, the contacts 72 and 73 of the switch arm 1900, and a wire 74 back to the battery 1. The armatures 5, 8, 11, and 14 are used for the testing and the making of the roads B, B', C, C' respectively (as will hereinafter be described with reference to Figs. 2 and 2ᴀ and 3 and 3ᴀ) so that the above-traced testing circuit for the road A cannot be completed if any testing or making of any of the roads B, B', C, and C' is being effected, since the said armatures are raised when used for closing testing or clearance current circuits for their respective roads, and when the armature 5 is so raised contacts 4, 134, 265, and 225 carried thereby but insulated therefrom cease to make contact with contacts 3, 135, 266, and 226 respectively, when the armature 8 is so raised contacts 7, 132, 263, and 223 carried thereby but insulated therefrom cease to make contact with contacts 6, 133, 264, and 224 respectively, when the armature 11 is so raised contacts 10, 130, 261, and 221 carried thereby but insulated therefrom cease to make contact with contacts 12, 129, 260, and 220 respectively, and when the armature 14 is so raised contacts 13, 128, 259, and 219 carried thereby but insulated therefrom cease to make contact with contacts 15, 127, 258, and 218 respectively. In addition to the circuit already described, current flows parallelly as follows: (1) from the rails 24 along a points blade 88 (Fig. 1) to a point near an insulation 87, thence by way of a wire 89, a contact 90 (Fig. 1$^A$), a contact 91 carried by but insulated from the armature 21 (the contacts 90 and 91 being in contact when the relay coil 236 is not energized), a wire 92, the contacts 93 and 94 of the switch arm 1900, a wire 95, a track relay coil 96, and a wire 97 to a track rail 1010 at a point near the insulation 88, and thence along the track rail 1010 to the track rails 67; (2) from the rails 24 (Fig. 1$^A$) by way of a points blade 75 (Fig. 1), a wire 76 (Fig. 1$^A$), a track relay coil 77, a wire 78, a contact 79, a contact 80 carried by but insulated from the armature 21 (the contacts 79 and 80 being in contact when the relay 236 is not energized), a wire 81, a wire 82 (Fig. 1), the contacts 83 and 84 of the switch arm 1900, and a wire 85 to a track rail 86, and thence to the track rails 59; (3) from the points blade 1007 along the rails 50 to a point opposite an insulation 114, thence by way of a wire 106, a wire 107, the contacts 108 and 109 of the switch arm 1900, a wire 110, a track relay coil 111, and a wire 112 to track rails 113 at a point near the insulation 114, and thence along the track rails 113 to the track rails 59; and (4) from the points blade 60 along the rails 59 to a point opposite an insulation 105, thence by way of a wire 99, the contacts 100 and 101 of the switch arm 1900, a wire 102, a track relay coil 103, and a wire 104 to the track rails 98 at a point near the insulation 105 and thence along the rails 98 to the rails 67. Then, if no train is located on any part of the track tested—i. e., the portions of the track between the insulation 1005 and the insulations 25, 105, and 114—and if the insulations 26, 49, 58, 2010, 1068, and 87 are all in order, the track relay coils 28, 35, 52, 65, 96, 77, 111, and 103 are all energized and raise their respective armatures 121, 122, 120, 118, 117, 119, 115, and 116 and current then flows from the battery 1 as hereinbefore described as far as the wire 23 (near the armature 21), thence by way of a wire 123, a contact 124, and a contact 125 carried by but insulated from the armature 21 (the contacts 124 and 125 being in contact when the relay coil 236 is not energized) a wire 126, the contacts 127 and 128 of the armature 14, the contacts 129 and 130 of the armature 11, a wire 131, the contacts 132 and 133 of the armature 8, the contacts 134 and 135 of the armature 5, a wire 136, the contacts 137 and 138 of the switch arm 1900, a wire 139, the armature 122 (Fig. 1$^A$), a contact 140, a wire 141, a contact 142, the armature 121, a wire 143, the armature 120, a contact 144, a wire 145, the armature 119, a contact 146, a wire 147, the armature 118 (Fig. 1), a contact 148, a wire 149, the armature 117, a contact 150, a wire 151, the armature 116, a contact 152, a wire 153, the armature 115, a contact 154, a wire 155, the contacts 156 and 157 of the switch arm 1900, and a wire 158 to a relay coil 159 (Fig. 1$^A$), and thence by way of a wire 160, and the wire 74 back to the battery 1. The relay coil 159, being energized, raises its armature 161 so that contacts 168 and 181 carried thereby but insulated therefrom make contact with contacts 167 and 180 respectively, and current flows from a battery 162 by way of a wire 163, a contact 1630, a contact 164 carried by but insulated from an armature 165 (adapted to occupy the position shown, in which the contacts 1630 and 164 are in contact, when its relay coil 213 is not energized), a wire 166, the contacts 167 and 168 of the armature 161, a wire 169, a contact 170, a contact 172 carried by but insulated from an armature 171 (adapted to occupy the position shown in which the contacts 170 and 172 are in contact, when its relay coil 187 is not energized), and a wire 173 to a terminal 174 of a points motor 175 (Fig. 1$^A$), thence through a winding to a terminal 176 thereof, and thence by way of a wire 177, a contact 522, a contact 521 carried by but insulated from an armature 564 (shown in Fig. 2$^A$), a contact 612, a contact 611 carried by but insulated from an armature 613 (shown in Fig. 3$^A$), and a wire 177 back to the battery 162. The armatures 564 (Fig. 2$^A$) and 613 (Fig. 3$^A$) are used, when raised by the energization of their respective relay coils 556 and 639, to close, by means of contacts, circuits for supplying clearance current for the roads B and B', and C and C' respectively as hereinafter described with reference to Figs. 2 and 2$^A$ and 3 and 3$^A$, and when so raised the contacts 521 and 611 cease to make contact with the contacts 522 and 612 so that the circuit to the points motor 175 cannot be completed if clearance current is being supplied to any of the roads B, B', C, and C'. The points motor 175 is so connected that the passage of current therethrough from the terminal 174 to the terminal 176 causes it to rotate in such a direction as to cause the points further from the terminus to move into the required position for making the road A and to cause a pair of detector contacts 183 and 184 to be closed after the points have been moved into and locked in the required position, and current then flows from the wire 158 (near the relay coil 159) by way of a wire 179, contacts 180 and 181 of the armature 161, a wire 182, the detector contacts 183 and 184 (Fig. 1A), and a wire 186, to the relay coil 187, and thence by way of a wire 188 and the wires 160 and 74 back to the battery 1. The relay coil 187 thus being energized raises its armature 171 and breaks the connection between the contacts 170 and 172 and makes contact between the contacts 170 and 189, and between a contact 199 carried thereby but insulated therefrom and a contact 198, and current then flows from the battery 162 to the contact 170 by way of the path hereinbefore described, thence by way of the contact 189, a wire 190, a contact 191, a contact 192 carried by but insulated from an armature 193 (the armature 193 being in the position in which the contacts 191 and 192 are in contact when its relay coil 204 is not energized), and a wire 194 to a terminal 195 on a points motor 196 (Fig. 1), thence through a winding to a terminal 197 thereof, and thence by way of the wire 177 and the contacts 522, 521, 612, and 611 (Fig. 1A) back to the battery 162. The points motor 196 is so connected that the passage of current therethrough from the terminal 195 to the terminal 197 causes it to rotate in such a direction as to cause the points nearer to the terminus to move into the required position for making the road A, and to cause a pair of detector contacts 201 and 202 to make contact after the points have been moved into and locked in the required position, and current then flows from the wire 158 to the detector contacts 183 and 184 as hereinbefore described, thence by way of the wire 186, the contacts 198 and 199 of the armature 171, a wire 200, the detector contacts 201 and 202, and a wire 203 to the relay coil 204 (Fig. 1A), and thence by way of a wire 205 and the wires 188, 160, and 74 back to the battery 1. The relay coil 204, being thus energized, raises its armature 193 so that a contact 207 carried thereby but insulated therefrom makes contact with a contact 208, and current then flows as hereinbefore described to the wire 203, thence by way of the contacts 207 and 208 of the armature 193, a wire 209, a contact 210 carried by but insulated from the armature 21, a contact 211 (the contacts 210 and 211 being in contact when the relay coil 236 is not energized), and a wire 212 to the relay coil 213, and thence by way of a wire 214, the contacts 215 and 216 of the switch arm 1900, a wire 217, the contacts 218 and 219 of the armature 14 (Fig. 1A), the contacts 220 and 221 of the armature 11, a wire 222, the contacts 223 and 224 of the armature 8, the contacts 225 and 226 of the armature 5, a wire 227, and the wires 160 and 74 back to the battery 1. The relay coil 213 is thus energized and raises its armature 165 and thus breaks the connection between the contacts 164 and 1630 and makes contact between contacts 230, 233, 250, 255, 243, 269, 371, and 378 carried thereby but insulated therefrom and contacts 229, 234, 251, 254, 244, 268, 372, and 379 respectively, and current then flows from the battery 1 by way of the wire 2, a wire 228, the contacts 229 and 230 (of the armature 165) and a wire 231 to the relay coil 213 and returns to the battery 1 as hereinbefore described; the energization of the relay coil 213 is thus made independent of the energization of the relay coils 159 and 187 (i. e., independent of the energization of the track relays 28, 35, 52, 65, 77, 96, 103, and 111 used for testing), and dependent only upon the positions of the switch arm 1900 and of the armatures 5, 8, 11, and 14. Current also flows from the wire 231 by way of a wire 232, the contacts 233 and 234 of the armature 165 and a wire 235, to the relay coil 236, thence by way of a wire 237 to the wire 214, and thence back to the battery 1 as hereinbefore described. The relay coil 236 is thus energized and raises its armature 21 and so breaks the connections between the contacts 20, 70, 91, 46, 80, 125, and 210 and the contacts 22, 69, 90, 47, 79, 124, and 211 respectively and so cuts off the supply of current to the track relays for testing purposes. The raising of the armature 165, in consequence of the energization of the relay coil 213, also allows current to flow from an alternator 238 (Fig. 1) by way of a wire 239, the contacts 240 and 241 of the switch arm 1900, a wire 242, the contacts 243 and 244 of the armature 165 (Fig. 1), a wire 245, and the wire 48 to the rails 50 at a point near the insulation 49, thence along the rails 50 and the points blade 1007, thence by way of the wire 51, a wire 249, the contacts 250 and 251 of the armature 165, a wire 252, and the wire 57 (Fig. 1) to the track rail 1008, thence along the track rails 1008, 59, and 60, thence by way of the wire 61, a wire 253, the contacts 254 and 255 of the armature 165 (Fig. 1A), a wire 256, and the wire 66 (Fig. 1) to the track rails 1009, thence along the track rails 1009 and 67 to a point 1001 at the left-hand end of the track portion I, and thence by way of a wire 257, the contacts 258 and 259 of the armature 14 (Fig. 1ᴬ), the contacts 260 and 261 of the armature 11, a wire 262, the contacts 263 and 264 of the armature 8, the contacts 265 and 266 of the armature 5, a wire 267, the contacts 268 and 269 of the armature 165, and a wire 270 back to the alternator 238. The alternating current thus supplied to the track rails on one side of the road A is adapted to give clearance to a train to proceed along the road A.

To test and make the road A' the switch arm 1900 is moved to the left into the position in which contacts 302, 314, 329, 333, 325, 321, 345, 306, 309, 318, 336, 354, 359, 364, 368, and 376 carried thereby but insulated therefrom make contact with contacts 301, 313, 328, 332, 324, 322, 344, 305, 310, 317, 335, 355, 360, 363, 369, and 375 respectively, and current then flows from the battery 1 by way of the wire 2, the contacts 3 and 4 of the armature 5, the contacts 6 and 7 of the armature 8, the wire 9, the contacts 10 and 12 of the armature 11, the contacts 13 and 15 of the armature 14, the wire 16, a wire 300, the contacts 301 and 302 of the switch arm 1900, a wire 303, the wire 19, the contacts 20 and 22 of the armature 21, and a wire 23 to the track rails 24 at a point near the insulation 25 (Fig. 1), thence along the track rails 24 to a point near insulation 26 (Fig. 1ᴬ), thence by way of the wire 27, the track relay coil 28, the wire 29, a wire 304, the contacts 305 and 306 of the switch arm 1900, a wire 307, the wire 45, the contacts 46 and 47 of the armature 21 (Fig. 1ᴬ), and the wire 48 to the track rails 50 at a point near the insulation 49, thence along the track rails 50 and the points blade 1007, thence by way of the wire 51, the track relay coil 52, the wire 53, a wire 308, the contacts 309 and 310 of the switch arm 1900, a wire 311, and the wire 57 to the track rail 1008 at a point near the insulation 58, thence along the track rails 1008, 59, and 60, thence by way of the wire 61, a wire 327, the contacts 328 and 329 of the switch arm 1900, a wire 330, the wire 64, the track relay coil 65 and a wire 66 to the track rail 1009 at a point near the insulation 59, thence along the track rails 1009 and 67 to a point opposite the insulation 25, and thence by way of the wire 68, the contacts 69 and 70 of the armature 21 (Fig. 1ᴬ), the wire 71, a wire 312, the contacts 313 and 314 of the switch arm 1900, a wire 315 and the wire 74 back to the battery 1. In addition to flowing as above, current flows parallelly as follows: (1) from the rails 24 to the points blade 88 (Fig. 1), thence by way of the wire 89, the contacts 90 and 91 of the armature 21 (Fig. 1ᴬ), the wire 92, a wire 334 (Fig. 1), the contacts 333 and 332 of the switch arm 1900, a wire 331, the wire 95, the track relay coil 96, the wire 97, and the rails 98 to the rails 67; (2) from the rails 24 to the points blade 75, thence by way of the wire 76, the track relay coil 77 (Fig. 1ᴬ), the wire 78, the contacts 79 and 80 of the armature 21, the wire 81, a wire 319, the contacts 318 and 317 of the switch arm 1900, a wire 316, and the rails 86 to the rails 59; (3) from the points blade 1007 along the rails 50 to a point opposite the insulation 114, thence by way of the wire 106, the contacts 322 and 321 of the switch arm 1900, a wire 320, the track relay coil 111, and a wire 112 to the rails 113 at a point near the insulation 114, and thence along the rails 113 to the rails 59; (4) from the points blade 60 along the rails 59 to a point opposite the insulation 105, thence by way of the wire 99, a wire 323, the contacts 324 and 325 of the switch arm 1900, a wire 326, the wire 102, the track relay coil 103, and the wire 104 to the rails 98 at a point near the insulation 105, and thence along the rails 98 to the rails 67; and (5) from the wire 300 by way of a wire 335, the contacts 336 and 337 of the switch arm 1900, and a wire 338 to the track rails 339 at a point near the insulation 25, thence along the rails 339 to a point opposite the point 1001, thence by way of a wire 340, a track relay coil 341, a wire 343, the contacts 344 and 345 of the switch arm 1900, a wire 346, and the wire 257 to the rail 67 at the point 1001, and thence along the rails 67 to the wire 68. The track relay coils 28, 52, 65, 96, 77, 111, 103, and 341 are thus energized and consequently raise their respective armatures 121, 120, 118, 117, 119, 115, 116, and 350, and current then flows from the wire 23 (Fig. 1ᴬ) by way of the branch wire 123, the contacts 124 and 125 of the armature 21, the wire 126, the contacts 127 and 128 of the armature 14, the contacts 129 and 130 of the armature 11, the wire 131, the contacts 132 and 133 of the armature 8, the contacts 134 and 135 of the armature 5, the wire 136, a wire 353 (Fig. 1), the contacts 354 and 355 of the switch arm 1900, a wire 356, a contact 357 (Fig. 1ᴬ), the armature 121, the wire 143, the armature 120, the contact 144, the wire 145, the armature 119, the contact 146, the wire 147, the armature 118 (Fig. 1), the contact 148, the wire 149, the armature 117, the contact 150, the wire 151, the armature 116, the contact 152, the wire 153, the armature 115, a contact 342, a wire 358, the armature 350, a contact 351, a wire 352, the contacts 359 and 360 of the switch arm A, a wire 361, and the wire 158 to the relay coil 159 (Fig. 1ᴬ), and thence by way of the wires 160 and 74 back to the battery 1. The relay coil 159 being thus energized, the points motors 175 and 196 are in turn caused to move their respective points into the positions for the road A' (which, of course, are the same as those for the road A) and to lock them therein as hereinbefore described with reference to the making of the road A, and, the points motor 196 having closed the detector contacts 201 and 202, the relay coil 204 is energized as hereinbefore described. The relay coil 204 being energized, current flows from the wire 158 to the relay coil 213 as hereinbefore described with reference to the making of the road A, thence by way of the wire 214, a wire 365, the contacts 364 and 363 of the switch arm 1900, and a wire 362 to the wire 217, and thence as hereinbefore described back to the battery 1. The relay 213 is thus energized and raises its armature 165, and current then flows from the battery 1 by way of the wires 2 and 228, the contacts 229 and 230 of the armature 165, and the wire 231 to the relay coil 213, and thence back to the battery 1 as hereinbefore described; the energization of the relay coil 213 is thus made independent of the energization of the relay coils 159 and 187— i. e., independent of the energization of the track relay coils 28, 52, 77, 65, 96, 103, 111, and 341—and dependent only upon the positions of the switch arm 1900 and of the armatures 5, 8, 11, and 14. The energization of the relay coil 213 causes the energization of the relay coil 236 (as hereinbefore described with reference to the making of the road A), which cuts off the supply of current to the track relays for testing purposes. Current also flows, in consequence of the raising of the armature 165, from an alternator 366 (Fig. 1) by way of a wire 367, the contacts 368 and 369 of the switch arm 1900, a wire 370, the contacts 371 and 372 of the armature 165 (Fig. 1A), a wire 373, and the wire 39 to the track rails 41, thence along the rails 41 to the wire 42, thence by way of the wire 42, a wire 374 (Fig. 1), the contacts 375 and 376 of the switch arm 1900, a wire 377, the contacts 378 and 379 of the armature 165, a wire 380, and the wire 48 to the track rails 50, thence along the rails 50 to the points blade 1007, thence by way of the wire 51, a wire 249, the contacts 250 and 251 of the armature 165, a wire 252 and the wire 57 to the track rail 1008, thence along the track rails 1008, 59, and 60 to the wire 61, thence by way of the wire 61, a wire 253, the contacts 254 and 255 of the armature 165, a wire 256, and the wire 66 (Fig. 1) to the track rails 67, thence along the track rails 67 to the wire 257, and thence by way of the wire 257, the contacts 258 and 259 of the armature 14, the contacts 260 and 261 of the armature 11, the wire 262, the contacts 263 and 264 of the armature 8, the contacts 265 and 266 of the armature 5, the wire 267, the contacts 268 and 269 of the armature 165, the wire 270, and a wire 381 (Fig. 1) back to the alternator 366. The alternating current thus supplied to the track rails on one side of the road A' is of a frequency different from that supplied by the alternator 238 for making the road A and is adapted to give clearance to a train to proceed along the road A'.

Figure 2A:
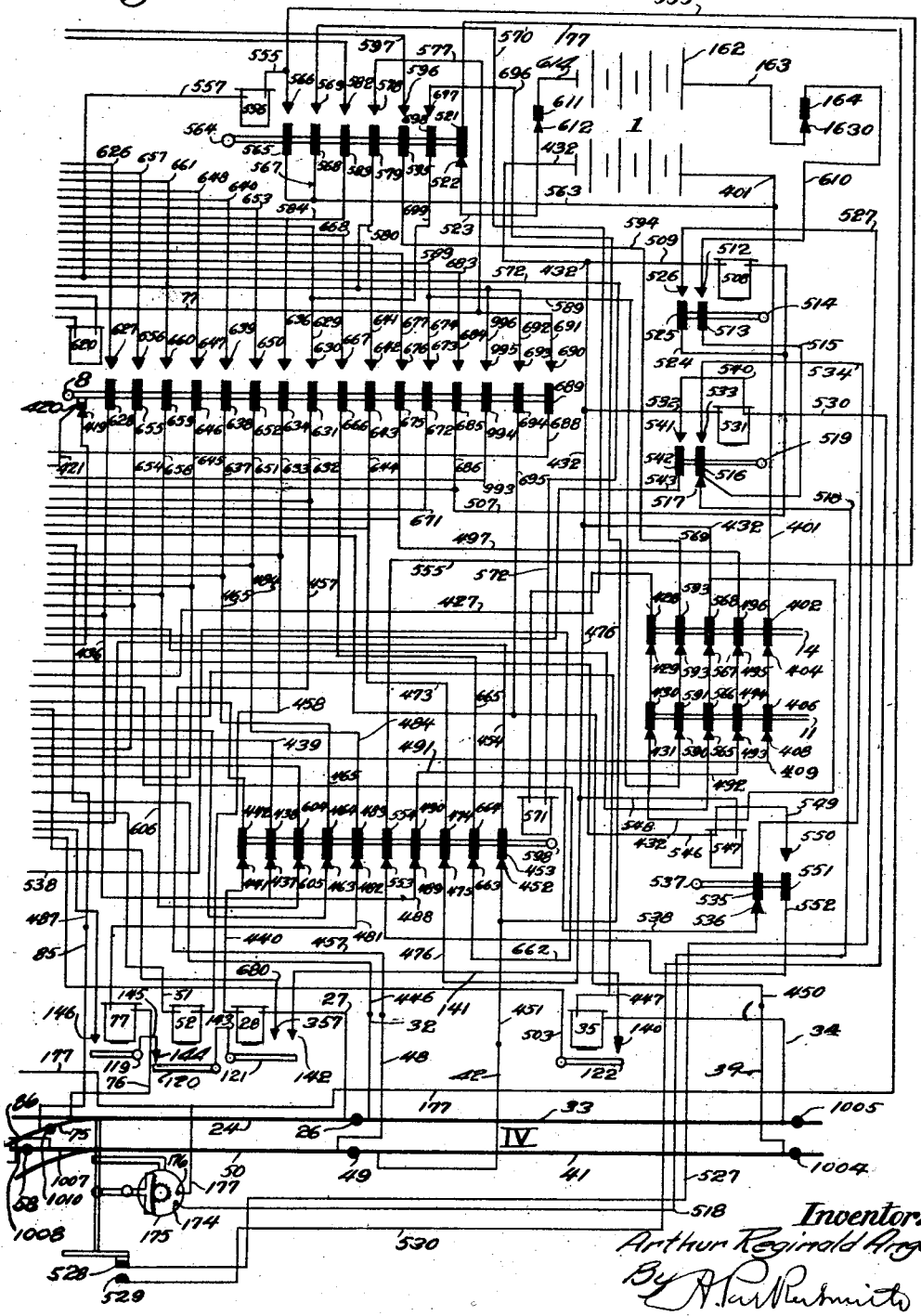

Figs. 2 and 2A together show the apparatus and connections for making the roads B and B', in which the manually operated element, instead of being a long switch arm as in the apparatus shown in Fig. 1 for making the roads A and A', is a small switch lever 1012 (Fig. 2) by means of which can be electrically operated the two armatures 5 (Fig. 2) and 8 (Fig. 2A) for doing the switching necessary for the two roads B and B' respectively.

To test and make the road B, the small switch lever 1012 is moved into the position shown in which it makes connection between its arms 413 and 423 and the contacts 414 and 422 respectively, so that current flows from the battery 1 (Fig. 2A) by way of a wire 401, contacts 402 and 404 of the armature 14, contacts 406 and 408 of the armature 11, a wire 409, a contact 410, a contact 411 of the switch arm 1900, a wire 412, the arm 413 of the reversing switch 1012, the contact 414, and a wire 415 to a relay coil 416, thence by way of a wire 418, a contact 419, a contact 420 carried by but insulated from the armature 8 (the contacts 419 and 420 being in contact when the armature 8 is in the position shown—i. e., when its relay coil 620 is not energized), a wire 421, the contact 422, the arm 423 of the reversing switch 1012, a wire 424, a contact 425 carried by but insulated from the switch arm 1900, a contact 426, a wire 427, contacts 428 and 429 of the armature 14, contacts 430 and 431 of the armature 11, and a wire 432 back to the battery 1. When the switch arm 1900 is in the neutral position shown (in Fig. 2)— i. e., when it has not been moved to either side to make the road A or the road A'— contacts 411, 678, 501, 587, 562, and 425 carried thereby but insulated therefrom make contact with contacts 410, 679, 502, 588, 563, and 426 respectively, and consequently the above traced circuit of the relay coil 416 which includes the contacts 410, 411, 425, and 426, can be completed only if the switch arm 1900 is in this position; the completion of the circuit of the relay coil 416 is also dependent upon the positions of the armatures 11 and 14, which are in the positions shown only if no testing or making of the roads C and C' respectively is being effected. The coil 416, being thus energized, raises its armature 5 so that contacts 575, 560, 506, 456, 498, 472, 449, 445, 459, 485, 466, 478, 607, 601, and 435 carried thereby but insulated therefrom make contact with contacts 576, 558, 505, 455, 499, 471, 448, 444, 460, 486, 467, 479, 608, 602, and 434 respectively, and current flows from the wire 412 by way of a wire 433, the contacts 434 and 435 of the armature 5, a wire 436, a contact 437, a contact 438 (Fig. 2A) carried by but insulated from an armature 598 (the contacts 437 and 438 being in contact when the armature 598 is in the position shown, which it occupies when its relay coil 571 is not energized), a wire 439, and the wire 23 (Fig. 2), to the track rails 24, thence along the track rails 24 to the wire 27 (Fig. 2A), thence by way of the wire 27, the track relay coil 28, a wire 440, a contact 441, a contact 442 carried by but insulated from the armature 598 (the contacts 441 and 442 being in contact when the relay coil 571 is not energized), a wire 443, the contacts 444 and 445 of the armature 5, a wire 446 and the wire 32 (Fig. 2A) to the track rails 33, thence along the rails 33 to the wire 34, thence by way of the wire 34, the track relay coil 35, a wire 447, the contacts 448 and 449 of the armature 5, a wire 450 and the wire 39 (Fig. 2A) to the track rails 41, thence along the track rails 41 to the wire 42, thence by way of the wire 42, a wire 451, a contact 452, a contact 453 carried by but insulated from the armature 598 (the contacts 452 and 453 being in contact when the relay coil 571 is not energized), a wire 454, the contacts 455 and 456 of the armature 5, a wire 457, and the wire 48 (Fig. 2A) to the track rails 50, thence along the track rails 50 to the points blade 1007 thence by way of the wire 51, the track relay coil 52, a wire 458, the contacts 459 and 460 of the armature 5, a wire 461, and the wire 57 to the track rail 1008, thence along the track rails 1008, 59, and 60 to the wire 61, thence by way of the wire 61, a wire 462, a contact 463 (Fig. 2A), a contact 464 carried by but insulated from the armature 598 (the contacts 463 and 464 being in contact when the relay coil 571 is not energized), a wire 465, the contacts 466 and 467 of the armature 5, a wire 468, the track relay coil 65 and a wire 66 to the track rails 67, thence along the rails 67 to the wire 68, and thence by way of the wire 68, a wire 470, the contacts 471 and 472 of the armature 5, a wire 473, a contact 474 (Fig. 2A) carried by but insulated from the armature 598, a contact 475 (the contacts 474 and 475 being in contact when the relay coil 571 is not energized) a wire 476 and the wire 432 back to the battery 1. In addition to flowing as above indicated current flows parallelly as follows: (1) from the rails 24 to the points blade 88 (Fig. 2), and thence by way of the wire 89, a wire 477, the contacts 478 and 479 of the armature 5, a wire 480, the track relay coil 96, and a wire 97 to the track rails 67; (2) from the rails 24 (Fig. 2A) to the points blade 75, and thence by way of the wire 76, the track relay coil 77, a wire 481, a contact 482, a contact 483 carried by but insulated from the armature 598 (the contacts 482 and 483 being in contact when the relay coil 571 is not energized), a wire 484, the contacts 485 and 486, a wire 487, a wire 85, and the track rail 86 to the track rails 59; (3) from the points blade 1007 along the track rails 50 to the wire 106, and thence by way of the wire 106, a wire 600, the contacts 601 and 602 of the armature 5, the wire 1602 the track relay coil 111, the wire 112 and the track rails 113 to the track rails 59; and (4) from the points blade 60 along the track rails 59 to the wire 99, and thence by way of the wire 99, a wire 603, a contact 604 carried by but insulated from the armature 598, a contact 605 (the contacts 604 and 605 being in contact when the relay coil 571 is not energized) a wire 606, the contacts 607 and 608 of the armature 5, a wire 609, the track relay coil 103, a wire 104, and the track rails 98 back to the track rails 67. The track relay coils 28, 35, 65, 96, 77, 111, 103, and 52 are thus energized and raise their respective armatures 121, 122, 118, 117, 119, 115, 116, and 120 and current flows from the wire 436 (near the armature 598) by way of a wire 488, a contact 489, a contact 490 carried by but insulated from the armature 598 (the contacts 489 and 490 being in contact when the relay coil 571 is not energized), wires 491 and 492, contacts 493 and 494 of the armature 11, contacts 495 and 496 of the armature 14, a wire 497, the contacts 498 and 499 of the armature 5, a wire 500, the contacts 501 and 502 of the switch arm 1900, a wire 503, the armature 122 (Fig. 2A), the contact 140, the wire 141, the contact 142, the armature 121, the wire 143, the contact 144, the armature 120, the wire 145, the armature 119, the contact 146, the wire 147, the contact 148 (Fig. 2), the armature 118, the wire 149, the armature 117, the contact 150, the wire 151, the armature 116, the contact 152, the wire 153, the armature 115, the contact 154, a wire 504, the contacts 505 and 506 of the armature 5, and a wire 507, to the relay coil 508 (Fig. AA), and thence by way of a wire 509 and the wire 432 back to the battery 1. The relay coil 508 corresponds to the relay coil 159 (Fig. 1A) described with reference to the making of the roads A and A′ as it controls the operation of the points motors 175 and 196 and the energization of a relay coil 556 in a manner similar to that described with reference to the relay coil 159 (the relay coil 556 corresponding to the relay coil 213 of Fig. 1A), as will now be described. The relay coil 508, being energized, raises its armature 514 so that contacts 513 and 525 carried thereby but insulated therefrom make contact with contacts 512 and 526 respectively, and current flows from the battery 162, by way of the wire 163, the contacts 1630 and 164 of the armature 165 (Fig. 1A), a wire 610 (Fig. 2A), the contacts 512 and 513 of the armature 514, a wire 515, a contact 516 carried by but insulated from an armature 519, a contact 517 (the contacts 516 and 517 being in contact when the armature 519 is in the position shown, which it occupies when its relay coil 531 is not energized), and a wire 518 to the terminal 174 of the points motor 175, thence through the aforesaid winding to the terminal 176 thereof, thence by way of the wire 177, the contacts 521 and 522 of the armature 564 (Fig. 2ᴬ) which are in contact when the relay coil 556 is not energized, a wire 523, the contacts 612 and 611 of the armature 613, (Fig. 3ᴬ) and a wire 614 (Fig. 2ᴬ) back to the battery 162. The points motor 175 moves the points further from the terminus into the required position for the road B and locks them therein as hereinbefore described with reference to the making of the roads A and A′ and thus closes two additional detector contacts 528 and 529 (not shown in Figs. 1 and 1ᴬ), and current then flows from the wire 507 (Fig. 2ᴬ) by way of a wire 524, the contacts 525 and 526 of the armature 514, a wire 527, the detector contacts 528 and 529, and a wire 530 to the relay coil 531, and thence by way of a wire 532 and the wire 432 back to the battery 1. The relay coil 531, being energized, raises its armature 519 so that the contact 516 ceases to make contact with the contact 517 and makes contact with a contact 533, and a contact 542 carried thereby but insulated therefrom makes contact with a contact 541, and current then flows from the contact 516 by way of the contact 533, a wire 534, a contact 535 carried by but insulated from an armature 537, a contact 536 (the contacts 535 and 536 being in contact when the armature 537 is in the position shown, which it occupies when its relay coil 547 is not energized), and a wire 538 to a terminal 539 of the points motor 196 (Fig. 2), thence through a winding to the terminal 197 thereof, and thence by way of the wire 177 back to the battery 1 as hereinbefore described. The passage of current through the points motor 196 from the terminal 539 to the terminal 197 causes it to rotate so as to cause the points nearer to the terminus to move into the required position for making the road B and to cause a pair of detector contacts 544 and 545 to be closed and current then flows from the wire 530 by way of a wire 540, the contacts 541 and 542 of the armature 519, a wire 543, the detector contacts 544 and 545, and a wire 546 to the relay coil 547, and thence by way of a wire 548 and the wires 476 and 432 back to the battery 1. The relay coil 547, being thus energized, raises its armature 537 so that the contacts 535 and 536 cease to make contact with one another and a contact 551 carried thereby but insulated therefrom makes contact with a contact 550, and current then flows from the wire 546 by way of a wire 549, the contacts 550 and 551, a wire 552, a contact 553, a contact 554 carried by but insulated from the armature 598 (the contacts 553 and 554 being in contact when the relay coil 571 is not energized), and a wire 555 to the relay coil 556, and thence by way of a wire 557, the contacts 558 and 560 of the armature 5 (Fig. 2), a wire 561, the contacts 562 and 563 of the switch arm 1900, a wire 564, contacts 565 and 566 of the armature 11 (Fig 2ᴬ), contacts 567 and 568 of the armature 14, and the wire 432 back to the battery 1. The relay coil 556, being thus energized raises its armature 564 so that the contacts 521 and 522 cease to make contact with each other and contacts 565, 568, 583, 579, 595, and 698 carried by but insulated from the armature 564 make contact with contacts 566, 569, 582, 578, 596, and 697 respectively, and current then flows from the battery 1 by way of the wire 401, a wire 563, the contacts 565 and 566 of the armature 564, and a wire 555 to the relay coil 556 and thence back to the battery 1 as hereinbefore described. The energization of the relay coil 556 is thus made independent of the energization of the relay coils 508 and 531—i. e., independent of the energization of the track relays 28, 35, 52, 65, 77, 96, 103, and 111—and dependent only upon the positions of the armature 5, the switch arm 1900, and the armatures 11 and 14. Current also flows from the wire 563 by way of a wire 567, the contacts 568 and 569 of the armature 564 and a wire 570 to the relay coil 571, and thence by way of a wire 572, the wire 557 and back to the battery 1 as hereinbefore described. The relay coil 571 is thus energized and raises its armature 598 so that the supply of current to the track relays for testing purposes is cut off. The energization of the relay coil 556 also allows current to flow from the alternator 238 by way of a wire 574, the contacts 575 and 576 of the armature 5, a wire 577, the contacts 578 and 579 of the armature 564, a wire 580, the wire 454, the contacts 455 and 456 of the armature 5, a wire 457, and the wire 48 to the track rails 50, thence along the track rails 50 to the points blade 1007, thence by way of the wire 51, a wire 581, the contacts 582 and 583 of the armature 564 (Fig. 2ᴬ), a wire 584, and the wires 461 (Fig. 2) and 57 to the track rail 1008, thence along the track rails 1008 and 59 to a point 1002 at the left-hand end of the track portion II, thence by way of a wire 585, the contacts 588 and 587 of the switch arm 1900, a wire 589, contacts 590 and 591 of the armature 11, contacts 592 and 593 of the armature 14, a wire 594, the contacts 595 and 596 of the armature 564 and a wire 597 to the alternator 238. The alternating current thus supplied to the rails on one side of the road B is adapted to give a train clearance to pass along the road B.

To test and make the road B' the switch lever 1012 is moved into the position in which its arms 413 and 423 make contact with the contacts 618 and 625 respectively, and current consequently flows from the battery 1 to the arm 413 as hereinbefore described, thence by way of the contact 618 and a wire 619 to the relay coil 620 (Fig. 2ᴬ), thence by way of a wire 621, a contact 622, a contact 623 carried by but insulated from the armature 5 (the contacts 622 and 623 being in contact when the relay coil 416 is not energized) a wire 417, and the contact 625 to the arm 423 and thence back to the battery 1 as hereinbefore described. The coil 620, being thus energized, raises its armature 8 into a position in which contacts 628, 655, 659, 646, 638, 652, 634, 631, 666, 642, 675, 672, 685, 994, and 694 carried thereby but insulated therefrom make contact with contacts 627, 656, 660, 647, 639, 650, 635, 630, 667, 642, 676, 673, 684, 995, 693, and 690 respectively, and current flows from the wire 412 (Fig. 2) by way of the wire 433, a wire 626, the contacts 627 and 628 of the armature 8, the wire 436, the contacts 437 and 438 of the armature 598, and the wires 439 and 23 (Fig. 2) to the track rails 24, thence along the track rails 24 to the wire 27 (Fig. 2ᴬ), thence by way of the wire 27, the track relay coil 28, the wire 440, the contacts 441 and 442 of the armature 598, the wire 443, a wire 629 (Fig. 2ᴬ), the contacts 630 and 631 of the armature 8, a wire 632, and the wires 457 and 48 to the track rails 50, thence along the track rails 50 to the points blade 1007, thence by way of the wire 51, the track relay coil 52, the wire 458, a wire 633, the contacts 634 and 635 of the armature 8, a wire 636, and the wires 584, 461 (Fig. 2), and 57 to the track rail 1008, thence along the track rails 1008 and 59 to the points blade 80, thence by way of the wires 61 and 462 (Fig. 2ᴬ), the contacts 463 and 464 of the armature 598, the wire 465, a wire 637, the contacts 638 and 639 of the armature 8, a wire 640, the wire 468 (Fig. 2), the track relay coil 65, and the wire 66 to the track rail 1009, thence along the track rails 1009 and 67 to the wire 68, and thence by way of the wire 68, the wire 470, a wire 641, the contacts 642 and 643 of the armature 8, a wire 644, the wire 473, the contacts 474 and 475 of the armature 598, and the wires 476 and 432 back to the battery 1. In addition to flowing as above indicated, current flows parallelly as follows: (1) from the rails 24 to the points blade 88 (Fig. 2) and thence by way of the wire 89, the wire 477, a wire 645 (Fig. 2ᴬ), the contacts 646 and 647 of the armature 8, a wire 648, the wire 480 (Fig. 2), the track relay coil 96, and the wire 97 to the track rails 67; (2) from the rails 24 to the points blade 75, and thence by way of the wire 76, the track relay coil 77, the wire 481, the contacts 482 and 483 of the armature 598, the wire 484, a wire 651, the contacts 652 and 650 of the armature 8, a wire 653, the wires 487 (Fig. 2) and 85, and the track rail 86 to the rails 59; (3) from the points blade 60 along the track rails 59 to the wire 99, and thence by way of the wire 99, a wire 603, the contacts 604 and 605 of the armature 598, the wire 606, a wire 658, the contacts 659 and 660 of the armature 8, a wire 661, the wire 609 (Fig. 2), the track relay coil 103, the wire 104, and the track rails 98 to the rails 67; (4) from the points blade 1007 along the track rails 50 to the wire 106, and thence by way of the wire 106, the wire 600, a wire 654 (Fig. 2ᴬ), the contacts 655 and 656 of the armature 8, a wire 657, the wire 1602 (Fig. 2), the track relay coil 111, the wire 112, and the track rails 113 to the rails 59; and (5) from the wire 433 (Fig. 2) by way of a wire 668 (Fig. 2ᴬ), the contacts 667 and 666 of the armature 8, a wire 665, the contacts 664 and 663 of the armature 598, and a wire 662 to track rails 998 (Fig. 2) at a point near the insulation 105, thence along the track rails 998 to a point opposite the point 1002, and thence by way of a wire 669, a track relay coil 670, a wire 671, the contacts 672 and 673 of the armature 8, a wire 674, the wire 589, the contacts 587 and 588 of the switch arm 1900, the wire 585, and the track rails 586 to the track rails 59. Thus if there is no train on any part of the track tested and the insulations tested are all in order, the track relays 670, 111, 103, 96, 65, 77, 52, and 28 are energized and raise their respective armatures 681, 115, 116, 117, 118, 119, 120, and 121 and current then flows from the wire 436 (near the armature 598), by way of the wire 488, the contacts 489 and 490, the wire 491, the contacts 493 and 494 of the armature 11, the contacts 495 and 496 of the armature 14, the wire 497, the contacts 675 and 676 of the armature 8, a wire 677, the contacts 678 and 679 of the switch arm 1900, a wire 680, a contact 357 (Fig. 2ᴬ), the armature 121, a wire 143, the armature 120, the contact 144, the wire 145, the armature 119, the contact 146, the wire 147, the contact 148 (Fig. 2), the armature 118, the wire 149, the armature 117, the contact 150, the wire 151, the armature 116, the contact 152, the wire 153, the armature 115, a contact 342, a wire 997, the armature 681, a contact 682, a wire 683, the contacts 684 and 685 of the armature 8, a wire 686 and the wire 507 to the relay coil 508, and thence by way of the wires 509 and 432 back to the battery 1. The relay coil 508 being thus energized, the points motors 175 and 196 are in turn caused to move their respective points into the positions for the road B' (which, of course, are the same as those for the road B) and to lock them therein as hereinbefore described with reference to the making of the road B, and, the points motor 196 having closed the detector contacts 544 and 545, the relay coil 547 is energized as hereinbefore described. The relay coil 547, being energized, raises its armature 537, and current then flows from the wire 546 by way of the wire 549, the contacts 550 and 551 of the armature 537, the wire 552, the contacts 553 and 554 of the armature 598, and the wire 555 to the relay coil 556, and thence by way of the wire 557, a wire 996, the contacts 995 and 994 of the armature 8, a wire 993, the wire 561, the contacts 562 and 563 of the switch arm 1900, the wire 564, the contacts 565 and 566 of the armature 11, the contacts 567 and 568 of the armature 14, and the wire 432 back to the battery 1. The relay coil 556 is thus energized and raises its armature 564 and current then flows from the battery 1 by way of the wires 401 and 563, the contacts 565 and 566 of the armature 564, and the wire 555 to the relay coil 556, and thence back to the battery 1 as hereinbefore described; the energization of the relay coil 556 is thus made independent of the energization of the relay coils 508 and 531— i. e., independent of the energization of the track relays 28, 52, 77, 65, 96, 105, 111, and 670—and dependent only upon the positions of the armature 8, the switch arm 1900, and the armatures 11 and 14. The energization of the relay coil 556 causes the relay coil 571 to be energized and the supply of current to the track relays for testing purposes to be thereby cut off as hereinbefore described with reference to the making of the road B. The energization of the relay coil 556 also permits current to flow from the alternator 366 by way of the wire 367, a wire 688 (Fig. 2ᴬ), the contacts 689 and 690 of the armature 8, a wire 691, the wire 577, the contacts 578 and 579 of the armature 564, the wire 580, a wire 692, the contacts 693 and 694 of the armature 8, a wire 695, and the wires 450 and 39 to the track rails 41, thence along the track rails 41 to the wire 42, thence by way of the wires 42 and 451, a wire 696, the contacts 697 and 698 of the armature 564, wires 699 and 629, the contacts 630 and 631, a wire 632, and the wires 457 and 48 to the track rails 50, thence along the track rails 50 to the points blade 1007, thence by way of the wire 51, a wire 581, the contacts 582 and 583 of the armature 564, and the wires 584, 461, and 57 to the track rail 1008, thence along the track rails 1008, 59, and 586 to the wire 585, and thence by way of the wire 585, the contacts 588 and 587 of the switch arm 1900, the wire 589, the contacts 590 and 591 of the armature 11, the contacts 592 and 593 of the armature 14, the wire 594, the contacts 595 and 596 of the armature 564, and the wires 597, 270, and 381 back to the alternator 366. The alternating current thus supplied to the track rails of one side of the road B' from the alternator 366 is adapted to give clearance to a train to proceed along the road B'.

Figs. 3 and 3ᴬ together show the elements and connections for the testing and making of the roads C and C'.

To test and make the road C a switch lever 1013 is moved into a position in which its arms 714 and 723 make contact with contacts 715 and 722 respectively and current flows from the battery 1 by way of a wire 703, contacts 705 and 706 of the armature 5, contacts 707 and 708 of the armature 8, a wire 709, contacts 710 and 711 of the switch arm 1900, a wire 712, the arm 714, the contact 715, and a wire 716 to the relay coil 717, and thence by way of a wire 718, contacts 719 and 720 (Fig. 3ᴬ) of the armature 14 (the contacts 719 and 720 being in contact when the relay coil 862 is not energized), a wire 721, the contact 722 (Fig. 3), the arm 723, a wire 724, contacts 725 and 726 of the switch arm 1900, a wire 727, the contacts 728 and 729 of the armature 8 (Fig. 3ᴬ), the contacts 730 and 731 of the armature 5, and a wire 732 back to the battery 1. When the switch arm 1900 is in its neutral position contacts 711, 801, 1116, 924, 843, and 725 carried thereby but insulated therefrom make contact with contacts 710, 802, 1115, 923, 844, and 726 respectively and consequently the above traced circuit of the relay coil 717, which includes the contacts 711, 710, 725, and 726, can be completed only if the switch arm 1900 is in this position; the completion of the circuit of the relay coil 717 is also dependent upon the positions of the armatures 5 and 8, which are in the position shown only if no testing or making of either of the roads B and B' is being effected (as hereinbefore described with reference to Figs. 2 and 2ᴬ). The relay coil 717, being thus energized, raises its armature 11 so that contacts 810, 842, 806, 798, 765, 940, 748, 744, 754, 769, 758, 774, 786, 779, and 734 carried thereby but insulated therefrom make contact with contacts 811, 841, 805, 799, 766, 939, 747, 743, 755, 770, 759, 775, 785, 778, and 733 respectively, and current then flows from the battery 1 to the wire 712 as hereinbefore described, thence by way of a wire 713, the contacts 733 and 734 of the armature 11, a wire 735, a contact 736 (Fig. 3ᴬ), a contact 137 carried by but insulated from an armature 1101 (the contacts 736 and 137 being in contact when the armature 1101 is in the position shown, which it occupies when its relay coil 858 is not energized), and a wire 738 to the track rails 24 (Fig. 3), thence along the track rails 24 to the wire 27, thence by way of the wire 27 (Fig. 3A), the track relay coil 28, a wire 739, a contact 740, a contact 741 carried by but insulated from the armature 1101 (the contacts 740 and 741 being in contact when the relay coil 858 is not energized), a wire 742, the contacts 743 and 744 of the armature 11 (Fig. 3), and a wire 745 to the track rails 35 (Fig. 3A), thence along the track rails 33 to the wire 34, thence by way of the wire 34, the track relay coil 35, a wire 746, the contacts 747 and 748 of the armature 11 (Fig. 3), a wire 1127, and the wire 39 (Fig. 3A) to the track rails 41, thence along the rails 41 to the wire 42, thence by way of the wire 42, a wire 934, a contact 935, a contact 936 carried by but insulated from the armature 1101 (the contacts 935 and 936 being in contact when the relay coil 858 is not energized), a wire 937, the contacts 939 and 940 of the armature 11, a wire 749, and the wire 48 (Fig. 3A) to the track rails 50, thence along the track rails 50 to the points blade 1007, thence by way of the wire 51, the track relay coil 52, a wire 750, a contact 751, a contact 752 carried by but insulated from the armature 1101 (the contacts 751 and 752 being in contact when the relay coil 858 is not energized), a wire 753, the contacts 754 and 755 of the armature 11, a wire 756, and the wire 57 to the track rail 1008, thence along the track rails 1008, 59, and 60 to a wire 757, thence by way of the wire 757, the contacts 758 and 759 of the armature 11, a wire 760, the track relay coil 65, and the wire 66 to the track rail 1009, thence along the track rails 1009 and 67 to a wire 761, and thence by way of the wire 761, a contact 762 (Fig. 3A), a contact 763 carried by but insulated from the armature 1101 (the contacts 762 and 763 being in contact when the relay coil 858 is not energized), a wire 764, the contacts 765 and 766 of the armature 11 (Fig. 3), and wires 767 and 732 back to the battery 1. In addition to flowing as above indicated, current flows parallelly as follows: (1) from the rails 24 to the points blade 88 (Fig. 3), and thence by way of the wire 89, a wire 773, the contacts 774 and 775 of the armature 11, a wire 776, the track relay coil 96, and the wire 97 to the track rails 67; (2) from the rails 24 to the points blade 75 (Fig. 3A), and thence by way of the wire 76, the track relay coil 77, a wire 768, the contacts 769 and 770 of the armature 11, a wire 771, the wire 85 and the track rail 86 to the rail 59; (3) from the points blade 1007 along the rails 50 to the wire 106, and thence by way of the wire 106 (Fig. 3), a wire 783, a contact 782, a contact 781 carried by but insulated from the armature 1101 (the contacts 782 and 781 being in contact when the relay coil 858 is not energized), a wire 780, the contacts 779 and 778 of the armature 11, a wire 777, the track relay coil 111, a wire 112, and the track rails 113 to the rails 59; and (4) from the points blade 60 along the track rails 59 to the wire 99, thence by way of the wire 99, a wire 787, the contacts 786 and 785 of the armature 11, a wire 784, the track relay coil 103, the wire 104, and the track rails 98 to the rails 67. Then if no train is located on any part of the track tested and if all the insulations tested are in order, the track relay coils 28, 35, 52, 65, 77, 96, 103, and 111 are all energized and raise their respective armatures 121, 122, 120, 118, 119, 117, 116, and 115 and current then flows from the wire 735 near the armature 1101 by way of a wire 788, a contact 789, a contact 790 carried by but insulated from the armature 1101 (the contacts 789 and 790 being in contact when the relay coil 858 is not energized), a wire 791, contacts 792 and 793 of the armature 8, contacts 794 and 795 of the armature 5, a wire 796, a wire 797, the contacts 798 and 799 of the armature 11, the contacts 801 and 802 of the switch arm 1900, a wire 803, the armature 122 (Fig. 3A), the contact 140, the wire 141, the contact 142, the armature 121, the wire 143, the armature 120, the contact 144, the wire 145, the armature 119, the contact 146, the wire 147, the contact 148 (Fig. 3), the armature 118, the wire 149, the armature 117, the contact 150, the wire 151, the armature 116, the contact 152, the wire 153, the armature 115, the contact 154, a wire 804, the contacts 805 and 806 of the armature 11 and the wire 807 to the relay coil 808 (Fig. 3A), and thence by way of a wire 809 and the wire 732 back to the battery 1. The relay coil 808, being thus energized, raises its armature 819 so that contacts 818 and 826 carried thereby but insulated therefrom make contact with contacts 817 and 827 respectively, and current then flows from the battery 162 by way of the wire 163, the contact 1630 and the contact 164 of the armature 165 (Fig. 1A), a wire 816, the contacts 817 and 818 of the armature 819, a wire 820, a contact 821 carried by but insulated from the armature 823, a contact 822 (the contacts 821 and 822 being in contact when the armature 823 is in the position shown, which it occupies when its relay coil 832 is not energized), and a wire 824 to the terminal 1740 of the points motor 175, thence through a winding to the terminal 176 thereof, and thence by way of the wire 177, the contacts 521 and 522 of the armature 564 (Fig. 2A), a wire 523, the contact 612, the contact 611 carried by but insulated from the armature 613 (the contacts 611 and 612 being in contact when the armature 613 is in the position shown, which it occupies when its relay coil 839 is not energized), and a wire 614 back to the battery 162. The flow of current through the points motor 175 from the terminal 1740 to the terminal 176 causes it to rotate in such a direction as to cause the points further from the terminus to move into the required position for the road C and to cause a pair of detector contacts 829 and 830 to be closed after the points have been moved into and locked in the required position, and current then flows from the wire 807 (near the relay coil 808) by way of a wire 825, the contacts 826 and 827 of the armature 819, a wire 828, the detector contacts 829 and 830, and a wire 831 to the relay coil 832, thence by way of a wire 833 and the wire 732 back to the battery 1. The relay coil 832 is thus energized and raises its armature 823 so that the contacts 821 and 822 cease to make contact with each other and a contact 834 carried by but insulated from the armature 823 makes contact with a contact 835 and current then flows from the wire 831 by way of the contacts 834 and 835 of the armature 823, a wire 1835, a contact 836 carried by but insulated from the armature 1101, a contact 837 (the contacts 836 and 837 being in contact when the relay coil 858 is not energized), and a wire 838 to the relay coil 839, and thence by way of a wire 840, the contacts 841 and 842 of the armature 11 (Fig. 3), a wire 1130, the contacts 843 and 844 of the switch arm 1900, a wire 1845, the contacts 845 and 846 of the armature 8 (Fig. 3A), the contacts 847 and 850 of the armature 5, a wire 851, and the wire 732 back to the battery 1. The relay coil 839, being thus energized, raises its armature 613 so that contacts 853, 855, 1124, 813, and 931 carried thereby but insulated therefrom make contact with contacts 854, 856, 1125, 814, and 932, and current then flows from the battery 1 by way of a wire 852 and the contacts 853 and 854 of the armature 613 to the relay coil 839, and thence back to the battery 1 as hereinbefore described. The energization of the relay coil 839 is thus made independent of the energization of the relay coil 808—i. e., independent of the energization of the track relays 28, 35, 52, 65, 77, 96, 103, and 111 used for testing—and dependent only upon the positions of the armature 11, the switch arm 1900, and the armatures 5 and 8. Current also flows from the wire 852 by way of the contacts 855 and 856 of the armature 613, and a wire 857 to the relay coil 858, thence by way of a wire 859 to the wire 840, and thence back to the battery 1 as hereinbefore described. The relay coil 858, being thus energized, raises its armature 1101 and so cuts off the supply of current to the track relays for testing purposes. The energization of the relay coil 839 also permits current to flow from the alternator 238 by way of a wire 239, the contacts 810 and 811 of the armature 11, a wire 812, the contacts 813 and 814 of the armature 613 (Fig. 3A), a wire 815, the wire 749, and the wire 48 back to the track rails 50, thence along the track rails 50 to a point 1003 at the left-hand end of the track portion III, thence by way of a wire 922, the contacts 923 and 924 of the switch arm 1900, a wire 925, the contacts 926 and 927 of the armature 8, contacts 928 and 929 of the armature 5, a wire 930, the contacts 931 and 932 of the armature 613, a wire 933, and a wire 270 back to the alternator 238. The alternating current thus supplied to the track rails on one side of the road C is adapted to give a train clearance to proceed along the road C.

To test and make the road C′, the switch lever 1013 is moved into a position in which its arms 714 and 723 make contact with contacts 860 and 866 respectively, and current then flows from the battery 1 to the arm 714 as hereinbefore described, thence by way of the contact 860 and a wire 861 to the relay coil 862, thence by way of a wire 1862, contacts 863 and 864 of the armature 11, a wire 865, and the contact 866 to the arm 723, and thence back to the battery 1 as hereinbefore described. The relay coil 862 (Fig. 3A), being thus energized, raises its armature 14 so that contacts 869, 873, 877, 881, 886, 890, 894, 897, 901, 905, 909, 913, 916, and 919 carried thereby but insulated therefrom make contact with contacts 868, 872, 876, 880, 885, 889, 893, 896, 900, 904, 908, 912, 915, and 918 respectively, and current then flows from the wire 712 (Fig. 3) by way of the wire 713, a wire 867, the contacts 868 and 869 (Fig. 3A), a wire 870, the wire 735, the contacts 736 and 137 of the armature 1101, and the wire 738 to the track rails 24 (Fig. 3), thence along the rails 24 to the wire 27 (Fig. 3A), thence by way of the wire 27, the track relay coil 28, a wire 739, the contacts 740 and 741 of the armature 1101, the wire 742, a wire 895, the contacts 896 and 897 of the armature 14, a wire 898, the wire 749, and the wire 48 to the track rails 50, thence along the track rails 50 to the points blade 1007, thence by way of the wire 51, the track relay coil 52, a wire 750, the contacts 751 and 752 of the armature 1101, the wire 753, the contacts 894 and 893 of the armature 14, a wire 892, and the wires 756 and 57 to the track rail 1008, thence along the track rails 1008, 59 (Fig. 3) and 60 to the wire 757, thence by way of the wire 757, a wire 887, the contacts 886 and 885 (Fig. 3A), a wire 884, the wire 760 (Fig. 3), the track relay coil 65, and the wire 61 to the track rail 1009, thence along the track rails 1009 and 67 to the wire 761, and thence by way of the wire 761, the contacts 762 and 763 of the armature 1101 (Fig. 3A), the wire 764, the contacts 909 and 908 of the armature 14, a wire 907, and the wire 732 back to the battery 1. In addition to flowing as above indicated, current flows parallelly as follows: (1) from the rails 24 to the points blade 88, thence by way of the wire 89, a wire 773, a wire 882 (Fig. 3A), the contacts 881 and 880 of the armature 14, a wire 878, the wire 776 (Fig. 3), the track relay coil 96, and the wire 97 to the rails 67; (2) from the rails 24 to the points blade 75, thence by way of a wire 76, the track relay coil 77, the wire 768, a wire 891, the contacts 890 and 889 of the armature 14, a wire 888, the wires 771 and 85, and the track rail 86 to the rails 59 (Fig. 3); (3) from the points blade 1007 along the rails 50 to the wire 106 (Fig. 3), thence by way of the wires 106 and 783 (Fig. 3A), the contacts 782 and 781 of the armature 1101, a wire 780, a wire 874, the contacts 873 and 872 of the armature 14, a wire 871, the wire 777 (Fig. 3), the track relay coil 111, the wire 112, and the track rails 113 to the rails 59; (4) from the points blade 60 along the track rails 59 to the wire 99, thence by way of the wires 99 and 787 (Fig. 3A), a wire 879, the contacts 877 and 876 of the armature 14, a wire 875, the wire 784 (Fig. 3), the track relay coil 103, the wire 104, and the track rails 98 to the rails 67; and (5) from the wire 715 (Fig. 3) by way of a wire 899, the contacts 900 and 901 of the armature 14, a wire 902, the contacts 1102 and 1103 of the armature 1101 and a wire 1104 to the track rails 1105 (Fig. 3), thence along the track rails 1105 to a point opposite the point 1003, thence by way of a wire 1106, a track relay coil 1107, a wire 906, the contacts 905 and 904 of the armature 14, a wire 903, the wire 925, the contacts 924 and 923 of the switch arm 1900, and a wire 922 to the track rails 1108 at the point 1003, and thence along the rails 1108 to the rails 50. Then, if there is no train on any part of the track tested and all the insulations tested are in order, the track relay coils 1107, 111, 103, 96, 65, 77, 52, and 28 are energized and raise their respective armatures 1109, 115, 116, 117, 118, 119, 120, and 121, and current then flows from the wire 735 (near the armature 1101) by way of the wire 788, the contacts 789 and 790 of the armature 1101, the wire 791, the contacts 792 and 793 of the armature 8, the contacts 794 and 795 of the armature 5, the wire 798, a wire 914, the contacts 913 and 912 of the armature 14, the wire 1110, the contacts 1116 and 1115 of the switch arm 1900, the wire 1114, the contact 357 (Fig. 3A), the armature 121, the wire 143, the armature 120, the contact 144, the wire 145, the armature 119, the contact 146, the wire 147, the contact 148 (Fig. 3), the armature 118, the wire 149, the armature 117, the contact 150, the wire 151, the armature 116, the contact 152, the wire 153, the armature 115, the contact 342, the wire 1120, the armature 1109, a contact 1112, a wire 911, the contacts 915 and 916 of the armature 14, and the wire 807 to the relay coil 808, and thence by way of the wires 809 and 732 back to the battery 1. The relay coil 898 being thus energized, the points motor 175 is caused to move the points further from the terminus into the position for the road C' (which, of course, is the same as that for the road C) and to lock them therein as hereinbefore described with reference to the making of the road C, and, the points motor 175 having closed the detector contacts 829 and 830, the relay coil 832 is energized as hereinbefore described. The relay coil 832, being energized, raises its armature 823 and current then flows from the wire 831 by way of the contacts 834 and 835 of the armature 823, the wire 1835, the contacts 836 and 837 of the armature 1101, and the wire 838 to the relay coil 839, and thence by way of the wire 840, a wire 917, the contacts 918 and 919 of the armature 14, the wire 1130, the contacts 843 and 844 of the switch arm 1900, a wire 1845, the contacts 845 and 846 of the armature 8, the contacts 847 and 850 of the armature 5, and the wires 851 and 732 back to the battery 1. The relay coil 839, being energized, raises its armature 613, and current then flows from the battery 1 by way of the wire 852, the contacts 853 and 854, and the wire 838 to the relay coil 839, and thence back to the battery 1 as hereinbefore described. The energization of the relay coil 839 is thus made independent of the energization of the relay coil 808—i. e., independent of the energization of the track relays 28, 52, 77, 65, 98, 103, 111, and 1107—and dependent only upon the positions of the armature 14, the switch arm 1900, and the armatures 5 and 8. Current also flows from the wire 852 by way of the contacts 855 and 856 of the armature 613, and a wire 857 to the relay coil 885, thence to the wire 859 and back to the battery 1 as hereinbefore described. The relay coil 858, being energized, raises its armature 1101 and so cuts off the supply of current to the track relays for testing purposes. The energization of the relay coil 839 also permits current to flow from the alternator 366 by way of the wire 367, a wire 922, the contacts 921 and 920 of the armature 14, a wire 1123, the contacts 1124 and 1125 of the armature 613, a wire 1126, and the wire 39 to the track rails 41, thence along the track rails 41 as far as a wire 1203 near the insulation 49, thence by way of a wire 1203, the contacts 1202 and 1201 of the armature 14, a wire 1200, the contacts 813 and 814 of the armature 613, a wire 815, and the wires 749 and 48 to the track rails 50, thence along the rails 50 and 1108 (Fig. 3) to the point 1003, and thence by way of the wire 922, the contacts 924 and 923 of the switch arm 1900, the wire 925, the contacts 926 and 927 of the armature 8, the contacts 928 and 929 of the armature 5, the wire 930, the contacts 931 and 932 of the armature 613, and the wires 933, 270, and 381 back to the alternator 366. The alternating current thus supplied to the track rails on one side of the road C″ is adapted to give clearance to a train to proceed along the road C′.

When the invention is to be used in connection with electric trains propelled by alternating current, alternating current or currents used for the purposes of this invention should be of a frequency or frequencies different from that used for propulsion: any known means may be employed for preventing or limiting interference between the propulsion current and the current or currents used for the purposes of this invention, and the current or currents supplied to the train for the purposes of this invention is or are preferably supplied by means of transformers or induction coils preferably at higher voltage or voltages than the propulsion current.

What I claim is:—

1. Track apparatus for the electrical control of trains on a system of track portions joined together by points, comprising in respect of a road of said system electro-responsive means adapted when energized to cause its movable portion to move from a danger position into a line-clear position and by said movable portion in said line-clear position to cause the movement of said points into a position for making said road, and a signalman's switching means adapted to occupy an inoperative position and a definite road-making position and only in said road-making position to cause electricity to pass through the rails of said road and so to produce the energization of said electro-responsive means but to be prevented by the occupation of said road by a railway vehicle from producing the energization of said electro-responsive means.

2. Track apparatus for the electrical control of trains on a system of track portions joined together by a first set of points, and a second set of points comprising in respect of a road of said system a signalman's switching means adapted to occupy a road-making position and an inoperative position, electro-responsive means adapted to be caused only in the case of the road-making position of said switching means to become energized so as to move its movable portion from a danger position into a line-clear position but to be prevented by the occupation of said road by a railway vehicle from becoming so energized and adapted by said movable portion in said line-clear position to cause the movement of said first set of points into a position for making said road, and means adapted to be caused by said movable portion, when said movable portion is in said line-clear position and said first set of points is in its proper position for making said road, to move said second set of points into a position for making said road.

3. Track apparatus for the electrical control of trains on a system of track portions joined together by points, comprising in respect of a road of said system a signalman's switching means adapted to occupy a road-making position and an inoperative position, electro-responsive means adapted to be caused only in the case of the road-making position of said switching means to become energized so as to move its movable portion from a danger position into a line-clear position but to be prevented by the occupation of said road by a railway vehicle from becoming so energized and adapted by said movable portion in said line-clear position to cause the movement of said points into a position for making said road, and means adapted to enable said movable portion, when said movable portion is in said line-clear position and said points are in their proper position for making said road to cause the transmission of train-clearance current so as to allow the passage of a train along said road.

4. Track apparatus for the electrical control of trains on a system of track portions joined together by a first set of points, and a second set of points comprising in respect of a road of said system a signalman's switching means adapted to occupy a road-making position and an inoperative position, electro-responsive means adapted to be caused only in the case of the road-making position of said switching means to become energized so as to move its movable portion from a danger position into a line-clear position but to be prevented by the occupation of said road by a railway vehicle from becoming so energized and adapted by said movable portion in said line-clear position to cause the movement of said first set of points into a position for making said road, means adapted to enable said movable portion, when said movable portion is in said line-clear position and said first set of points is in its proper position for making said road, to move said second set of points into a position for making said road and means adapted to enable said movable portion, when said movable portion is in said line-clear position and said second set of points is in its proper position for making said road, to cause the transmission of train-clearance current so as to allow the passage of a train along said road.

5. Track apparatus for the electrical control of trains along a road comprising a clearance circuit adapted when closed to enable a train to travel along said road, electro-responsive means adapted when energized to cause its movable portion to move from a danger position into a line-clear position and so to cause the closure of said clearance circuit, a signalman's switching means adapted to occupy an inoperative position and a road-making position and only in said road-making position to cause electricity to pass through the rails of said road and so to produce the energization of said electro-responsive means but to be prevented by the occupation of said road by a railway vehicle from producing the energization of said electro-responsive means, and means adapted to be caused by the movement of said movable portion into said line-clear position to cut off the supply as aforesaid of electricity to said rails and, notwithstanding such cutting off, in conjunction with the road-making position of said switching means to maintain the closure of said clearance circuit.

6. Track apparatus for the electrical control of trains on a system of track portions joined together by points, comprising in respect of a road of said system a clearance circuit adapted when closed to enable a train to travel along said road, electro-responsive means adapted when energized to cause its movable portion to move from a danger position into a line-clear position and by said movable portion in said line-clear position to cause the movement of said points into a position for making said road, means adapted to enable said movable portion, when said movable portion is in said line-clear position and said points are in their proper position for making said road, to cause said clearance circuit to be closed, a signalman's switching means adapted to occupy an inoperative position and a road-making position and only in said road-making position to cause electricity to pass through the rails of said road and so to produce the energization of said electro-responsive means but to be prevented by the occupation of said road by a railway vehicle from producing the energization of said electro-responsive means, and means adapted to enable said movable portion, when said movable portion is in said line-clear position and said points are in their proper position for making said road, to cause the cutting off of the supply as aforesaid of electricity to said rails and, notwithstanding such cutting off, in conjunction with the road-making position of said switching means to maintain the closure of said clearance circuit.

7. Track apparatus for the electrical control of trains on a system of track portions joined together by a first set of points, and a second set of points comprising in respect of a road of said system a clearance circuit adapted when closed to enable a train to travel along said road, electro-responsive means adapted when energized to cause its movable portion to move from a danger position into a line-clear position and by said movable portion in said line-clear position to cause the movement of said first set of points into a position for making said road, means adapted to enable said movable portion, when said movable portion is in said line-clear position and said first set of points is in its proper position for making said road to move said second set of points into a position for making said road, means adapted to enable said movable portion, when said movable portion is in said line-clear position and said second set of points is in its proper position for making said road, to cause said clearance circuit to be closed, a signalman's switching means adapted to occupy an inoperative position and a road-making position and only in said road-making position to cause electricity to pass through the rails of said road and so to produce the energization of said electro-responsive means but to be prevented by the occupation of said road by a railway vehicle from producing the energization of said electro-responsive means, and means adapted to enable said movable portion, when said movable portion is in its line-clear position and said second set of points is in its proper position for making said road, to cause the cutting off of the supply as aforesaid of electricity to said rails and, notwithstanding such cutting off, in conjunction with the road-making position of said switching means to maintain the closure of said clearance circuit.

Signed at New York, N. Y., this 26th day of May, 1925.

ARTHUR REGINALD ANGUS.